DIGITAL COMPUTER
Filed Jan. 23, 1961
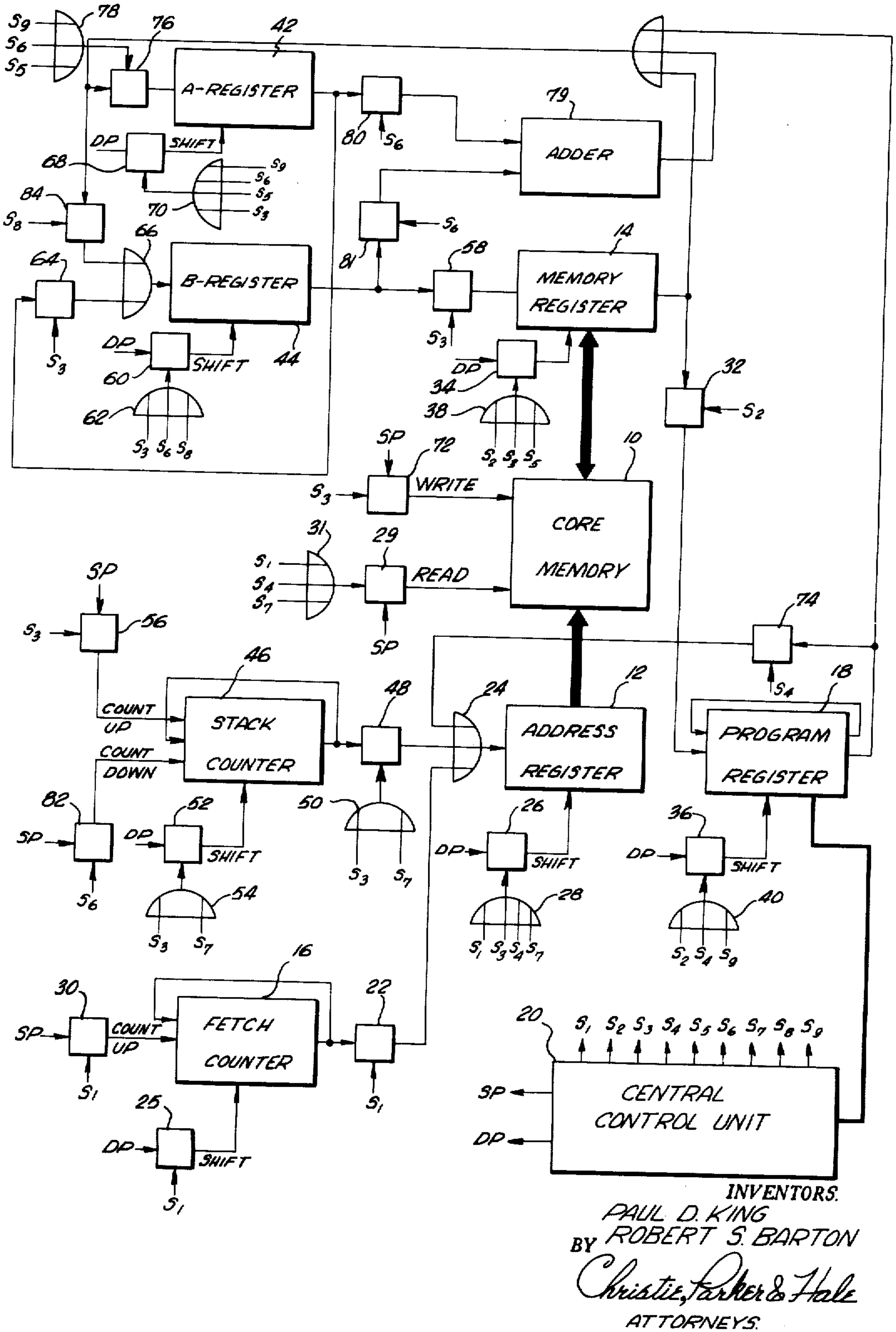
INVENTORS.
PAUL D. KING
ROBERT S. BARTON
BY Christie, Parker & Hale
ATTORNEYS.

United States Patent Office 3,200,379
Patented Aug. 10, 1965

3,200,379
DIGITAL COMPUTER

Paul D. King, Pasadena, and Robert S. Barton, Altadena, Calif., assignors to Burroughs Corporation, Detroit, Mich., a corporation of Michigan Filed Jan. 23, 1961, Ser. No. 84,156
6 Claims. (Cl. 340—172.5)

This invention relates to digital computers, and more particularly, is concerned with an internally programmed electronic digital computer having an improved organization and control of the components to provide simplified programming.

The development of the internally stored program computer is well known. In a conventional computer of this type, a set of instructions, called the program, is stored in the machine. Each instruction consists of two parts, referred to as the operation part and the address part. The operation part designates the operation to be performed, such as an addition, a subtraction, or the like. The address part specifies the address of the operand or operands to be used in the particular operation contained in that instruction. The computers may be either "single-address" machines or "multi-address" machines, depending upon whether a single operand or a group of operands are to be addressed for each instruction. Instructions in a multi-address machine may also include an address where a result of the operation is to be stored. The instructions are usually stored in sequential locations in memory so that the computer can advance from one instruction to the next in a predetermined order. The computer is arranged to alternately fetch an instruction and then execute the operation. The instructions available to the user of the machine, generally referred to as a programmer, constitute the machine language. In order to successfully operate the computer, the programmer must understand this machine language and be able to translate his problem into a set of numerically coded instructions which can be directly loaded into the machine.

Each computer is designed to have its own set of instructions which the designer of the computer believes essential to its successful operation. The job of the programmer, therefore, is highly specialized since he must be thoroughly familiar with the machine language of the particular computer with which he is working and must be able to translate his problem into this language in order to properly program the machine to achieve a solution to the problem.

In order to simplify the job of programming computers, attempts have been made to use the computer to generate its own program from information put into the machine in a language which more closely resembles a language in which the problem can be more easily stated. Thus so-called compiler routines were developed by which a particular computer can be made to act as a translator between the problem as set forth in a problem language and the machine language program necessary to make the computer perform as required to solve the problem. The development of automatic programming techniques has resulted in standardized problem languages: Two standardized problem languages have been developed. A language called ALGOL (algolrithmic language) is useful in stating algebraic problems. A corresponding problem language was developed for the type of data manipulation experienced in commercial and business problems. This language is referred to as COBOL (common business oriented language). By the use of compiler routines designed for each type computer, it is expected that the programmer should be able to state the problem in one of these two problem languages and the computer, by means of the compiler routine should then be able to translate this into a set of instructions defining the problem in machine language.

However, in presently available computers, a translation from Algol 60 or Cobol into machine language in the form of a set of instructions has not been satisfactorily solved. A conventional compiler routine to make the translation does three things: it examines the program language which is fed to it by the programmer, it creates an intermediate language, and then from an intermediate language generates the desired machine language statement of the problem, i.e., the required list of instructions. The need for the intermediate language is to permit the interpretation of enclosure symbols, such as parentheses and brackets found in conventional arithmetic expressions. Interpretation of the problem is not clear until both parts of a particular pair of enclosure symbols have been encountered. The intermediate language breaks up the program into separate groupings and provides a temporary storage location each time an enclosure symbol is encountered during the process of scanning the input problem. Because enclosure symbols may be nested and expressions can become quite complex, as for example, parentheses within brackets and the like, many temporary locations must be generated and later these temporary locations must be eliminated and the intermediate language cleaned up and condensed.

As a result, automatic programming by compiler techniques developed for known computers is a time consuming operation. Moreover, the resulting machine language program, commonly referred to as the object program, frequently is more complex than it need be because of artificialities that must be resorted to in order to carry out the automatic programming routine. As a result, the object program produced by a conventional compiler routine frequently takes considerably longer to run than a program written by an experienced programmer.

The present invention is directed to a computer which is organized so as to operate according to a machine language which is closely related to establish problem languages. As a result, the translation from program language to machine language can be greatly simplified. The need for an intermediate language in the translation can be eliminated, resulting in a greatly reduced translation time to go from the problem language into the machine language through a compiler routine. Moreover, inefficiencies previously scattered throughout a compiler-generated machine language program have been eliminated. The machine language of the computer of the present invention is as efficient as the problem language itself.

As pointed out above, conventional compiler routines require an intermediate language to provide a means of interpreting enclosure symbols such as parentheses. As a simple example, if the problem language states $$A=2(B+C)$$

the compiler breaks this into two groups which may be stated in an intermediate language as $$A=2\times T$$

$$T=B+C$$

Without the parentheses the problem would be ambiguous since it could be interpreted as $$A=2(B+C)=2B+2C$$

or as $$A=2B+C$$

However, the need for parentheses to avoid ambiguity can be avoided by an algebraic notation developed by a Polish mathematician, J. Lukasiewicz. According to the rules of this notation, hereinafter referred to as Polish notation, the operators, such as add, subtract, etc., are written to the right of a pair of operands, instead of between them. An operator is only applied to the previous two operands encountered or computed. Thus the above expression written in Polish notation becomes $$BC+2\times A=$$

This form of algebraic expression eliminates the need for parentheses or other types of enclosure symbols if the rules of interpretation of Polish notation are followed. These rules may be summarized as follows:

(1) Scan the string from left to right.
(2) Remember the operands and the order in which they occur.
(3) When an operator is encountered do the following:
   (a) Take the two operands which are last in order
   (b) Operate upon them according to the type of operator encountered
   (c) Eliminate these two operands from further consideration
   (d) Remember the result of (b) and consider it as the last operand in order.

The present invention is directed to a computer organized to operate according to these rules of Polish notation. In other words, the machine language of the computer is based on Polish notation. This enables a simple direct translation of standard problem languages such as Algol 60 or Cobol into machine language for automatic programming. The intermediate language steps outlined above of the compiler routine can be made to conform to Polish notation so as to eliminate enclosure symbol problems. The computer of the present invention operates directly in this intermediate language thereby eliminating any additional compiler step of translating from the intermediate to machine language.

In brief, the computer of the present invention is arranged to operate on a string of program control syllables (so designated herein to distinguish from conventional instructions used in "single-address" and "multi-address" machines). Several basic syllable types may be employed, including three types designated "operator" syllables, "value call" syllables, and "literal" syllables. The computer program consists of a string of these syllables arranged in a sequence according to the statement of the probem in Polish notation. The operators specify the various arithmetic and logical operations. Literals contain the operands. Value calls are used to designate the address in memory where desired operands can be obtained.

In addition to an addressable memory for storing operands and the program syllables, the computer includes a temporary storage facility, which may be a designated part of the main memory and called a "stack." The temporary storage stack includes a pair of registers which also form part of the arithmetic unit. Operands are entered in the stack through one of the registers in response to the execution of a literal or a value call in the program string, this register being in effect the top of the stack. As successive operands are entered in the stack, other operands are in effect moved down in the stack, from the register at the top to the other register and then into assigned memory locations. As operands are removed from the stack they in effect are moved up in reverse order, so that the last operand placed in the top of the stack is the first out. The successive operands appear in the register forming the top in the reverse order in which they were placed in the top of the stack as operands are removed from the stack. Arithmetic operations are performed, in response to the execution of operators in the program string, on the two operands in the two registers of the stack. The contents of these two registers are in effect eliminated from the stack and replaced by the result of the operation placed in the top of the stack. Thus an arithmetic operation always acts on the last two operands to be placed in the stack, puts the result back in the top of the stack, and reduces the contents of the stack by one word. Thus the stack operation satisfies rules 2 and 3 enumerated above.

In this manner, as will hereinafter become more obvious, an algebraic or logic expression written in Polish notation can be directly translated to a program consisting of a string of syllables from which the computation represented by the expression can be carried out.

For example, suppose that the value of the following expression, for a given set of values for the operands $a$, $b$, $c$, and $d$, is required:

$$(a+b)/(c-d)$$

Written in Polish notation, this expression becomes $$ab+cd-/$$

The syllable string program for the computer and the corresponding execution action using the stack is as follows (where the operands are stored in memory):

| | Program | Action | Contents of Stack |
|---|---|---|---|
| 1 | Value call for $a$ | $a\rightarrow$stack | $a$ |
| 2 | Value call for $b$ | $b\rightarrow$stack | $ab$ |
| 3 | Add operator | $a+b=r_1$* | $r_1$ |
| 4 | Value call for $c$ | $c\rightarrow$stack | $r_1c$ |
| 5 | Value call for $d$ | $d\rightarrow$stack | $r_1cd$ |
| 6 | Subtract operator | $c-d=r_2$ | $r_1r_2$ |
| 7 | Divide operator | $r_1/r_2=r_3$ | $r_3$ |

Top of the stack

* $r$ designates the result of a computation.

The chart illustrates the program, consisting of syllables numbered 1 through 7. There is one syllable for each operand and operation in the expression written in Polish notation. The value calls put the required operands in the stack, the operators perform the required arithmetic operation on the top two operands of the stack with the result being stored as an operand in the top of the stack.

For a better understanding of the invention, reference should be made to the accompanying drawing wherein there is shown a simplified block diagram of a computer incorporating the features of the present invention.

Referring to the drawing in detail, the numeral 10 indicates generally a random access memory, such as a magnetic core memory, in which binary coded words are stored in addressable memory locations. The memory locations are selected by binary coded addresses stored in an Address register 12. Binary coded information words are transferred into and out of specified memory locations in the core member 10 through an input/output Memory register 14. Whether transfer is from a specified memory location to the register 14 or from the register 14 to the specified address location is initiated by a pulse on one or the other of two inputs designated respectively the "Write" input or the "Read" input. Addressable core memories of this type are well known in the computer art. See for example the book "Digital Computer Components and Circuits," by R. K. Richards, D. Van Nostrand Company, 1957, chapter 8.

The program syllables are stored in a portion of the core memory 10 in consecutive memory locations. The syllables are read out of the core memory 10 in the required sequence under the control of a Fetch counter 16. The counter is initially set to a value corresponding to the address location of the first program syllable in memory and then is counted up one each time a program syllable is transferred out of memory. Since a serial operation is assumed throughout in which words are transferred character by character between registers, the counter 16 is arranged as a shift register. It will be clearly understood that serial operation is given by way of example only and the invention is equally applicable to parallel operation.

Each program syllable read out of the core memory 10 is transferred from the Memory register 14 to a Program register 18. It is while in the Program register 18 that the syllable is decoded to determine whether it is an arithmetic operator type syllable, a value call syllable or a literal syllable. Each program syllable contains two bits to designate which of the three types of syllables it is. After a syllable is placed in the Program register 18, the binary value of these bits is sensed and applied to decoding means forming part of the central control unit indicated generally at 20.

The function of the central control unit 20 is the same as in any computer, namely, to cause all the individual units of the computer to perform in such a manner that the program syllables are sensed in the proper sequence and executed. A suitable central control unit is described in detail in copending application Serial No. 788,823, filed January 26, 1959, in the name of Edward L. Glaser, and assigned to the assignee of the present invention. The central control unit is arranged to go through a succession of states in which high levels are applied to designated gates throughout the computer. The control unit 20 is shown as having nine states designated $S_1$ to $S_9$. For each of the three syllables, the control unit goes through a different sequence of states. Thus when a value call syllable is stored in the key regiter, the bits designating it as a value call are decoded by the central control unit causing states $S_1$–$S_5$ to be successively energized with a high potential level. For an operator syllable, the central control unit is caused to step through states $S_1$, $S_2$, $S_6$, $S_7$, and $S_8$. For the literal syllable, the central control steps through the states $S_1$, $S_2$, $S_3$ and $S_9$. It will be noted that states $S_1$ and $S_2$ are common to the execution of all three syllable types. The central control unit 20 is further arranged to generate a predetermined number of digit pulses, designated DP's, while in each state followed by one step pulse, designated SP. The generation of the SP causes the central control unit to advance to the next state.

The states $S_1$ and $S_2$ of the central control unit, which are common to all syllable executions, are used to control the fetch operation of the next syllable from the core memory. To this end, the $S_1$ state is applied to a gate 22 on the output of the Fetch counter 16, permitting transfer of the contents of the Fetch counter 16 through a "logical or" circuit 24 into the input of the Address register 12. $S_1$ also opens the gate 25, permitting DP's to be applied to the shift input of the Fetch register 16, the number of DP's generated during the state $S_1$ being sufficient to transfer a complete word from the Fetch counter 16 to the Address register 12. DP's are also applied through a gate 26 to the shift input of the Address register 12 in response to the $S_1$ state applied to the gate 26 through a "logical or" circuit 28. As a result, during state $S_1$ the contents of the Fetch counter 16 are placed in the address register 12. The SP then advances the central control unit 20 to the state $S_2$.

The SP generated at the end of the $S_1$ state is applied to the "Read" input of the core memory 10 by means of a gate 29. The gate 29 is biased open by the $S_1$ level applied through a "logical or" circuit 31. As a result, the contents of the memory location addressed by the Fetch counter are placed in the Memory register 14. The SP is also used to count up the Fetch counter 16 by applying it to a gate 30 which is open during the $S_1$ state. Thus the Fetch counter 16 is advanced to the address location of the next program syllable in the program string stored in the memory.

During the $S_2$ state, a gate 32 is open permitting transfer of information from the Memory register 14 to the Program register 18. DP's are applied to the shift inputs of the two registers respectively through gates 34 and 36. The high level of $S_2$ is applied to these respective gates through "logical or" circuits 38 and 40 respectively.

If a value call or a literal syllable has been transferred to the Program register 18, the central control unit is advanced to the state $S_3$. If an operator syllable has been transferred to the Program register 18, the central control unit jumps to state $S_6$. Consideration is first given to the operation of the computer assuming that a value call has been placed in the Program register 18, since this is normally the first syllable encountered in a program string. As mentioned above, the function of the value call is to transfer an operand from a specified memory location, the address of which is contained as part of the value call syllable, into the stack.

In the particular embodiment shown in the drawing, the stack consists of an A-register 42 which forms the top of the stack, a B-register 44 which represents the storage position immediately below the top of the stack, and a portion of the core memory 10 designated by a Stack counter 46. Normally an operand is placed in the top of the stack by inserting it in the A-register 42. The operand is moved down in the stack by transferring it from the A-register to the B-register 44 and from the B-register into the memory location in the core memory 10 designated by the Stack counter 46. Each time an operand is placed in the core memory 10, the Stack counter 46 is counted up one. Whenever an operand is removed from the core memory 10, the Stack counter 46 is first counted down one so that it corresponds to the location of the last operand to be placed in the core memory. In this way, the stack portion of the core memory is always addressed on the basis of the last operand in being the first operand out.

When a value call or a literal syllable is encountered, calling for an operand to be inserted in the top of the stack, the contents of the stack must be moved down. Thus when the central control counter advances to the state $S_3$, the contents of the Stack counter 46 are transferred to the Address register 12 through a gate 48 which is biased open by applying the $S_3$ level through a "logical or" circuit 50 to the gate 48. The stack counter 46 is arranged as a shift register, DP's being applied to a gate 52 to the shifting input of the Stack counter 46 during the state $S_3$ by applying the $S_3$ level to the gate 52 through a "logical or" circuit 54. DP's are also applied to shift the Address register 12 by applying the $S_3$ level to the "logical or" circuit 28 to bias open the gate 26. At the termination of the $S_3$ state, an SP is generated which is applied to the "count up" input of the Stack counter 46 through a gate 56 which is biased open during the state $S_3$.

Also during the state $S_3$, the contents of the B-register 44 are transferred to the Memory register 14 and the contents of the A-register 42 are transferred to the B-register 44. To this end, a gate 58 is biased open during the $S_3$ state and DP's are applied to the shift input of the B-register 44 through a gate 60 biased open by applying the $S_3$ level through a "logical or" circuit 62 to the gate 60. The gate 34 is also open during $S_3$ to apply DP's to the shift input of the Memory register 14. A gate 64 is biased open during the $S_3$ state permitting transfer from the A-register 42 to the B-register 44 through a "logical or" circuit 66. DP's are applied to the shift input of the A-register through a gate 68 which is biased open by applying the $S_3$ level through a "logical or" circuit 70 to the gate 68.

After the required number of DP's are generated during the $S_3$ state to shift the contents of the A-register 42 into the B-register 44 and shift the contents of the B-register 44 into the Memory register 14, a memory "Write" operation is initiated by an SP applied to the "Write" input of the core memory 10 through a gate 72.

Continuing with the assumption that a value call syllable is stored in the Program register 18, the central control unit now advances to the state $S_4$ during which the value call syllable is transferred to the Address register 12 where the address portion is used for addressing the core memory 10. To this end, during the $S_4$ state, a gate 74 is biased open permitting the flow of information from the program register 18 through the "logical or" circuit 24 to the address register 12. DP's are applied through the gate 26 to the shift input of the address register 12 and through the gate 36 to the shift input of the program register 18. When an SP is generated, it is applied through the gate 29 to the "Read" input of the core memory 10 causing the contents of the address memory location to be transferred into the Memory register 14. At the same time, the central control unit is advanced to the state $S_5$.

During the state $S_5$, the operand which is now in the Memory register 14 is transferred into the top of the stack, namely the A-register 42. To this end, a gate 76 is biased open by applying the $S_5$ state thereto through a "logical or" circuit 78. At the same time, DP's are applied to the shift input of the A-register 42 by biasing open the gate 68 and DP's are applied to the shift input of the Memory register 14 by biasing open the gate 34. At the completion of the $S_5$ state, the central control unit returns to the $S_1$ state to fetch the next program syllable.

Assume now that after again going through states $S_1$ and $S_2$, a literal syllable has been transferred to the Program register 18. The function of the literal syllable is to place itself in the stack. In executing a literal, therefore, state $S_3$ is repeated in which the contents of the Stack counter 46 are transferred to the Address register 12, the contents of the B-register 44 are transferred to the Memory register 14, the contents of the A-register 42 are transferred to the B-register 44, and the contents of the Memory register 14 are then read into the core memory 10. With everything in effect pushed down in the stack, the central control unit 20 now advances from state $S_3$ to state $S_9$ in which the gate 76 is biased open to permit transfer from the Program register 18 into the A-register 42. DP's are applied to the A-register and the B-register respectively through the gates 68 and 36. This completes execution of the literal syllable.

The central control unit again repeats states $S_1$ and $S_2$. It is now assumed that an operator syllable has been fetched from the core memory 10 into the Program register 18. This is decoded by the central control unit 20, causing it to advance from state $S_2$ to state $S_6$. During state $S_6$, an arithmetic unit including the A-register, the B-register, and an adder 79, is activated. The arithmetic unit is a conventional circuit which can be controlled to perform a number of arithmetic operations on the contents of the A-register and the B-register and to store the results back in the A-register. For example, the arithmetic unit provides for addition of the contents of the A-register and the B-register. It may also provide for subraction of the contents of the A-register from the contents of the B-register, the multiplication of the contents of the A-register and the B-register, or the division of the contents of the B-register by the contents of the A-register. Which of these four operations or other operations may be performed is determined by sensing a group of bits contained in the operator syllable as stored in the Program register 18 by the control unit 20. This group of bits when decoded by the central control circuit causes the control circuit to manipulate the A-register, B-register, and adder to perform the desired arithmetic computation.

The necessary gating for performing an add operation is shown. The above-mentioned copending application describes the operation of a suitable arithmetic unit in more detail. However, the particular design of arithmetic unit, whether it includes a serial adder or parallel adder, for example, is immaterial to the present invention. For the add operation, gates 80 and 81 are biased open during the $S_6$ state and DP's are applied to the A and B-registers through the gates 68 and 60 respectively. The output of the adder is coupled back to the A-register 42 through a gate 76.

At the completion of the $S_6$ state, the result of the arithmetic operation is stored in the A-register and the word stored in the B-register is of no more value since it has already been used in that arithmetic operation. Thus when the central control unit 20 is advanced to the $S_7$ state, the operation is initiated for bringing the last operand placed in the core memory 10 back into the B-register 44. Actually this operation is initiated during the $S_6$ state by applying an SP to the "count down" input of the Stack counter 46 through a gate 82. This returns the Stack counter to the address of the last operand transferred to the core memory 10.

When the central control unit is placed in the $S_7$ state, the contents of the Stack counter 46 are transferred to the Address register 12. Thus during the $S_7$ state, the gate 48 is biased open as are the gates 52 and 26, permitting the serial shifting of the contents of the Stack counter into the Address register. The SP occurring at the end of the $S_7$ state is applied through the gate 29 to initiate a readout from the core memory into the Memory register 14.

With the central control unit advanced to the $S_8$ state, a gate 84 is biased open permitting transfer of information from the Memory register 14 into the B-register 44. At the same time, DP's are applied through the gates 34 and 60 to the shifting inputs respectively of the Memory register 14 and the B-register 44. The central control unit 20 is now returned to the $S_1$ state to fetch the next syllable in the program string.

From the above description it will be recognized that a stored program computer is provided in which program syllables are examined in sequence from memory. Thus the program string of syllables is the full equivalent of the string of operands and operators of an expression of the problem in Polish notation. Each of these syllables either causes an operand to be transferred into the top of the stack or causes an arithmetic operation to be performed on the operands in the top two positions of the stack as represented by the A-register and the B-register. A value call syllable or a literal syllable, in placing an operand in the top of the stack, causes an automatic push-down of all the other operands in the stack, while an operator syllable causes an automatic pull-up of operands in the stack. The number of operands in the stack is reduced by each arithmetic operation.

It will be recognized that the computer, as described, further implements Polish notation as the machine language since, by means of the memory stack, it remembers the operands and the order in which they occur. An operator always executes an arithmetic operation only on the last two operands in the order they are placed in the stack. After operating on these operands, it eliminates them from further consideration. By means of the stack, it remembers the result of the operation and considers the result as the last operand in order.

What is claimed is:

1. A computing apparatus comprising first storing means for simultaneously storing temporarily an indefinite number of digitally coded operand words in addressable storage locations, the first storing means including means for transferring words from the addressable storage locations to an output and from an input to the addressable storage locations, first and second registers for storing two operand words, an arithemetic unit for performing arithmetic operations on the operand words stored in the two registers and storing the result in the first register, means for transferring operand words from the second register to the input of the first storing means and to the second register from the output of the first storing means, automatic addressing means associated with the first storing means and controlled by the transferring means the automatic addressing means assigning storage locations to successive words transferred to the storage locations from the input of the first storing means in a fixed predetermined sequence and assigning storage locations to successive words to be transferred to the output of the first storing means from the storage locations in the reverse sequence, whereby the last word to be transferred in is always the first word to be transferred out, means for transferring operand words from the first register to the second register, second storing means for storing a plurality of operand words, means for initiating a transfer of a selected operand word from the second storing means to the first register including means for automatically initiating transfer of the contents of the first register to the second register and the contents of the second register to the first storing means, and means for initiating an arithmetic operation including means for automatically initiating transfer of a word from the first storing means to the second register at the completion of the arithmetic operation.

2. A computing apparatus comprising first storing means for storing temporarily an indefinite number of digitally coded operand words in addressable storage locations, the first storing means including means for transferring words from the addressable storage locations to an output and from an input to the addressable storage locations, first and second registers for storing two operand words, an arithmetic unit for performing arithmetic operations on the operand words stored in the two registers and means for transferring operand words from the second register of the input of the first storing means and to the second register from the output of the first storing means, automatic addressing means associated with the first storing means and controlled by the transferring means, the automatic addressing means assigning storage locations to successive words transferred to the storage locations from the input of the first storing means in a fixed predetermined sequence and assigning storage locations to successive words to be transferred to the output of the first storing means from the storage locations in the reverse sequence, whereby the last words to be transferred in is always the first word to be transferred out, means for transferring operand words from the first register to the second register, second storing means for storing a plurality of operand words, means for automatically initiating the transfer of the contents of the first register to the second register and the contents of the second register to the first storing means, and means for initiating a transfer of a selected operand word from the second storing means to the first register.

3. A computer comprising first memory means, an address counter associated with the first memory means, the address counter being arranged to count up and count down, first and second registers associated with the first memory means, second memory means having operands stored in digital form in directly addressable portions thereof, third memory means for storing value calls and operators in digitally coded form, means including an address counter and a third register for transferring the value calls and operators out of the third memory means into the third register in sequence, means responsive to a value call in the third register for transferring a selected operand from the second memory means to the first register, means responsive to a value call in the third register for transferring the contents of the first register to the second register, transferring the contents of the second register to the first memory means, and counting up the address counter associated with the first memory means, means responsive to an operator in the third register for initiating an arithmetic operation on the contents of the first and second registers and storing the result in said first register, and means responsive to an operator in the third register for transferring the last word in order to be put in the first memory back to the second register and counting the address counter down one.

4. A digital processor comprising means for storing a plurality of digitally coded words in addressable storage locations, means including counting means for transferring a succession of words into the storage locations in an order fixed by the counting means, means controlled by the counting means for transferring the words out of the storage locations only in the reverse order in which they were transferred in, whereby the last word to be transferred to the storing means is always the first word to be transferred out of the storing means, first and second word registers, arithmetic means for performing arithmetic operations on the digital words in the first and second registers, and means responsive to the transfer of a new word to the first register for automatically transferring the contents of the second register to the storing means and transferring the contents of the first register to the second register.

5. A digital computing machine comprising means for storing operand words and operator words in digitally coded form, means for sensing the words in the storing means in a predetermined sequence, temporary storage means for storing an indefinite number of digitally coded words, means responsive to the sensing means when an operand word is sensed for transferring operand words into the temporary storage means, counter means for establishing the order in which each word is transferred to the temporary storage means, an arithmetic unit, means responsive to the sensing means when an operator word is sensed for initiating an arithmetic operation on the last two operand words transferred to the temporary storage means, means responsive to the initiating means for eliminating the last two operands from the temporary storage means when they are transferred to the arithmetic unit and transferring the result of the arithmetic operation back into the temporary storage means, and means responsive to the initiating means for adjusting the counter means to establish the result as the last operand word in order stored in the storage means.

6. Digital computer appratus comprising addressable storage means for initially storing a plurality of digitally coded operands, means for storing a plurality of program control syllables in digitally coded form, the control syllables being of at least two distinctly coded and separately identifiable types specifying respectively an address of an operand in the addressable storing means and an order for a particular operation, a temporary storage facility for storing a plurality of operands, means for transferring operands into and out of the temporary storage facility, means operatively associated with the temporary storage facility for identifying the order in which operands are received and stored in the temporary storage facility, operational means for generating a resultant operand in response to a pair of operands applied thereto, means for sensing each of the program syllables in controlled sequence, first control means responsive to the sensing means when a first type of coded program syllable is sensed for transferring an operand from the address in the addressable storage means specified by the program syllable in the temporary storage facility, the temporary storage facility having a large number of storage locations such that a number of operands can be transferred to the temporary storage facility by the first type of program syllables, second control means responsive to the sensing means when a second coded type of program syllable is sensed and responsive to the order identifying means for transferring the last two operands placed in the temporary storage facility to the operational means and returning the result to the temporary storage means, the second control means including means for adjusting the order identifying means such that the two operands transferred to the operational means are replaced by the resultant operand in the identified order in the temporary storage facility.

References Cited by the Examiner

UNITED STATES PATENTS 2,914,248 11/59 Ross et al. ------------ 235—157

OTHER REFERENCES

"Analysis of a Logical Machine Using Parenthesis-Free Notation," Burks, Warren and Wright, Mathematical Tables and Other Aids to Computation, pages 53–57, April 1954.

MALCOM A. MORRISON, *Primary Examiner.*

WALTER W. BURNS, Jr., *Examiner.*